United States Patent
Archibald et al.

(10) Patent No.: US 7,139,145 B1
(45) Date of Patent: Nov. 21, 2006

(54) CLUSTER-BASED DEFECT DETECTION TESTING FOR DISK DRIVES

(75) Inventors: Nevin A. Archibald, Canyon Country, CA (US); Tariq Iqbal, Corona, CA (US); Joseph M. Viglione, Laguna Hills, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 139 days.

(21) Appl. No.: 10/948,711

(22) Filed: Sep. 23, 2004

(51) Int. Cl.
 *G11B 5/02* (2006.01)
(52) U.S. Cl. ............................ 360/53; 360/25; 360/48; 360/51; 360/77.04
(58) Field of Classification Search ................ None
 See application file for complete search history.

(56) References Cited

U.S. PATENT DOCUMENTS

| | | | |
|---|---|---|---|
| 4,914,530 A * | 4/1990 | Graham et al. ............... 360/48 |
| 5,212,677 A * | 5/1993 | Shimote et al. .......... 369/53.17 |
| 5,798,883 A * | 8/1998 | Kim ............................ 360/31 |
| 5,907,448 A * | 5/1999 | Watanabe et al. ......... 360/77.04 |
| 5,991,699 A * | 11/1999 | Kulkarni et al. ............... 702/83 |
| 6,034,831 A * | 3/2000 | Dobbek et al. ................ 360/53 |
| 6,078,452 A * | 6/2000 | Kittilson et al. .............. 360/51 |
| 6,154,858 A * | 11/2000 | Ottesen et al. ................ 714/42 |
| 6,182,250 B1 * | 1/2001 | Ng et al. ..................... 714/704 |
| 6,204,660 B1 * | 3/2001 | Lee ............................. 324/212 |
| 6,281,676 B1 * | 8/2001 | Ottesen et al. ............... 324/212 |
| 6,704,153 B1 * | 3/2004 | Rothberg et al. .............. 360/31 |
| 6,731,442 B1 * | 5/2004 | Jin et al. ....................... 360/31 |
| 6,731,865 B1 * | 5/2004 | Yamamoto .................. 386/125 |
| 6,735,040 B1 * | 5/2004 | Galloway et al. ........ 360/78.06 |
| 6,751,757 B1 * | 6/2004 | Biskup et al. ................ 714/54 |
| 6,850,379 B1 * | 2/2005 | Andoh et al. ................. 360/53 |
| 6,876,445 B1 * | 4/2005 | Shibuya et al. .......... 356/237.2 |
| 6,950,265 B1 * | 9/2005 | Hetzler et al. ................ 360/75 |
| 6,985,319 B1 * | 1/2006 | Yip et al. ..................... 360/48 |
| 2006/0056088 A1 * | 3/2006 | Kudoh et al. ................. 360/31 |

* cited by examiner

*Primary Examiner*—Wayne Young
*Assistant Examiner*—Dismery Mercedes
(74) *Attorney, Agent, or Firm*—Blakely, Sokoloff, Taylor & Zafman (57) ABSTRACT

Disclosed are techniques related to cluster-based defect detection testing for disk drives. A disk drive comprises a disk, a moveable head to scan the tracks of the disk, and a defect detection circuit to detect defects on the disk scanned by the moveable head. The disk drive includes a microprocessor for controlling operations in the disk drive including cluster-based defect detection. The microprocessor under the control of a cluster detection program defines a scan window. The scan window corresponds to an area of the disk scanned by the moveable head. The microprocessor under the control of the cluster detection program further defines a cluster threshold corresponding to a minimum number of defects required to occur within the scan window and identifies a defect cluster if a cluster threshold of defects occurs within the scan window. By identifying defect clusters on the disk these defect clusters can be margined.

54 Claims, 9 Drawing Sheets

| RECORD # | CLUSTER NO. | HEAD NO. | TOTAL NO. DEFECTS | CENTROID TRACK | CENTROID WEDGE | CLUSTER DENSITY | DATA OR SERVO | OTHER |
|---|---|---|---|---|---|---|---|---|
| 1 | CLUSTER NO. | HEAD NO. | TOTAL NO. DEFECTS | CENTROID TRACK | CENTROID WEDGE | CLUSTER DENSITY | DATA OR SERVO | ... |
| 2 | CLUSTER NO. | HEAD NO. | TOTAL NO. DEFECTS | CENTROID TRACK | CENTROID WEDGE | CLUSTER DENSITY | DATA OR SERVO | ... |
| ... N | | | | | | | | |

CLUSTER-BASED DEFECT DETECTION TESTING FOR DISK DRIVES

BACKGROUND OF THE INVENTION

1. Field of the Invention

The present invention relates to disk drives. More particularly, the present invention relates to techniques for cluster-based defect detection testing for disk drives.

2. Description of the Prior Art and Related Information

Today, computers are routinely used both at work and in the home. Computers advantageously enable file sharing, the creation of electronic documents, the use of application specific software, and electronic commerce through Internet and other computer networks. Typically, each computer has a storage peripheral such as a disk drive (e.g. a hard disk drive).

Hard disk drives often employ a moveable head actuator to frequently access large amounts of data stored on the disk. A conventional hard disk drive has a head disk assembly ("HDA") including at least one magnetic disk ("disk"), a spindle motor for rapidly rotating the disk, and a head stack assembly ("HSA") that includes a head gimbal assembly (HGA) with a moveable head for reading and writing data. The HSA forms part of a servo control system that positions the head over a particular track on the disk to read or write information from and to that track, respectively.

A huge market exists for hard disk drives for mass-market computer systems such as servers, desktop computers, and laptop computers. To be competitive in this market, a hard disk drive should be relatively inexpensive and should embody a design that is adapted for low-cost mass production, while at the same providing high data storage capacity and providing rapid access to data.

Satisfying these competing constraints of low-cost, high data storage capacity, rapid access to data and improved reliability requires innovation in each of the numerous components of the disk drive, methods of assembly, and in testing.

One way to satisfy these competing constraints is by purchasing and utilizing disks (i.e. media) at particular price points, which have some amount of expected disk defects, and margining these disk defects during verification testing of the disk drive before ultimately sending the disk drive out to a customer.

Presently, during disk drive functionality testing, before the disk drive is sent out to the customer, the disk is scanned for defects to detect defect patterns that are the result of, for example, scratches and/or thermal asperities on the disk. These defects may also be caused by head loading, head slap, and delamination. Particularly, as is presently done, the entire surface of the disk is scanned and a map or table of detected defect patterns is generated. Based on this map, radial straight line margining occurs in which defect patterns are approximated as radial straight lines on the disk and these radial straight line are stored in the memory of the disk drive as areas that are not to be used for reading or writing data to (i.e. these radial straight lines are margined).

Unfortunately, these techniques do not take into account the random nature that characterizes the way that defects often occur on disk and the irregular shapes formed by these randomly occurring defects. Moreover, present disk defect testing techniques do not take into account the reoccurrence of cluster regions across many different disks for statistical quality control purposes. For example, the reoccurrence of particular cluster defect regions at specific areas across many different disks may indicate a problem with the assembly process or with disks being provided by a disk vendor for assembly into the disk drive.

SUMMARY OF THE INVENTION

The present invention relates to techniques for cluster-based defect detection testing for disk drives.

In one aspect, the invention may be regarded as a disk drive to perform cluster-based defect detection on a disk included within the disk drive. The disk drive comprises a disk including a plurality of tracks wherein each track includes servo wedges and data wedges, a moveable head to scan the tracks of the disk, and a defect detection circuit to detect defects on the disk scanned by the moveable head.

Further, the disk drive includes a microprocessor for controlling operations in the disk drive including cluster-based defect detection. The microprocessor under the control of a cluster detection program defines a scan window. The scan window corresponds to an area of the disk scanned by the moveable head. The microprocessor under the control of the cluster detection program further defines a cluster threshold corresponding to a minimum number of defects required to occur within the scan window and identifies a defect cluster if a cluster threshold of defects occurs within the scan window.

In one embodiment, the scan window may be a data scan window in which the area of the data scan window is defined by a number of tracks and data wedges and the data cluster threshold is defined as a minimum number of defects required to occur within the data scan window. If the data cluster threshold of defects is detected within the data scan window, then a data defect cluster is identified. Further, for each defect of an identified data defect cluster, the data scan window may be moved about each defect and other defects within the moved data scan window may be identified. The identified data defect cluster may then be re-defined to include the other identified defects.

In one embodiment the scan window may be a servo scan window in which the area of the servo scan window is defined by a number of tracks and a servo cluster threshold is defined as a minimum number of defects required to occur within the servo scan window. If the servo cluster threshold of defects is detected within the servo scan window for a servo wedge, then a servo defect cluster is identified.

In one embodiment, the microprocessor under the control of the cluster detection program may count a total number of both data defect clusters and servo defect clusters that have been identified and a defect cluster record of both identified data defect clusters and servo defect clusters may be generated. This defect cluster record may be transmitted to a defect database.

In one embodiment, the microprocessor under the control of the cluster detection program for each identified data defect cluster and servo defect cluster may associate a cluster number and a corresponding head. Further, for each identified data defect cluster and servo defect cluster, a total number of defects may be calculated as well as a cluster density. Furthermore, for identified data defect clusters, other attributes may be determined such as a centroid track, a centroid wedge, as well as cluster shape.

In one embodiment, the microprocessor under the control of the cluster detection program may further define a radial super cluster window based on a number of tracks and wedges and a radial super cluster event threshold based on a minimum number of centroids for corresponding identified data defect clusters required to occur within the radial super cluster window. If the minimum number of centroids for the corresponding identified data defect clusters are determined to be in the radial super cluster window, then a super radial data defect cluster may be identified. Additionally, the microprocessor under the control of the cluster detection program may further define a circumferential super cluster window based on a number of tracks and a circumferential super cluster event threshold based on a minimum number of centroids for corresponding data defect clusters that are required to occur within the circumferential super cluster window. If the minimum number of centroids for the corresponding identified data defect clusters are determined to be in the circumferential super cluster window, then a super circumferential data defect cluster is identified.

In one embodiment, the microprocessor under the control of the cluster detection program generates a super cluster event record of both identified super circumferential data defect clusters and super radial defect clusters. This super cluster event record may be transmitted to a defect database.

In a further aspect, the invention may be regarded as a method to perform cluster-based defect detection on a disk. The method comprises detecting defects on the disk scanned by the moveable head, defining a scan window corresponding to an area of the disk scanned by the moveable head, defining a cluster threshold corresponding to a minimum number of defects required to occur within the scan window, and identifying a defect cluster if the cluster threshold of defects is detected.

In yet another aspect, the invention may be regarded as a system including a disk drive to perform cluster-based defect detection on a disk included within the disk drive. The system comprises a defect database coupled to disk drive test equipment. The disk drive test equipment is coupled to the disk drive and implements disk drive functionality verification testing. The disk drive includes a disk having a plurality of tracks wherein each track includes servo wedges and data wedges, a moveable head to scan the tracks of the disk, a defect detection circuit to detect defects on the disk scanned by the moveable head, and a microprocessor for controlling operations in the disk drive including cluster-based defect detection. The microprocessor under the control of the cluster detection program defines a scan window corresponding to an area of the disk scanned by the moveable head and defines a cluster threshold corresponding to a minimum number of defects required to occur within the scan window. The microprocessor under the control of the cluster detection program further identifies a defect cluster if a cluster threshold of defects occurs within the scan window, generates a defect cluster record of identified defect clusters, and transmits the defect cluster record to the defect database.

The foregoing and other features of the invention are described in detail in the Detailed Description and are set forth in the appended claims.

DETAILED DESCRIPTION

Figure 1:
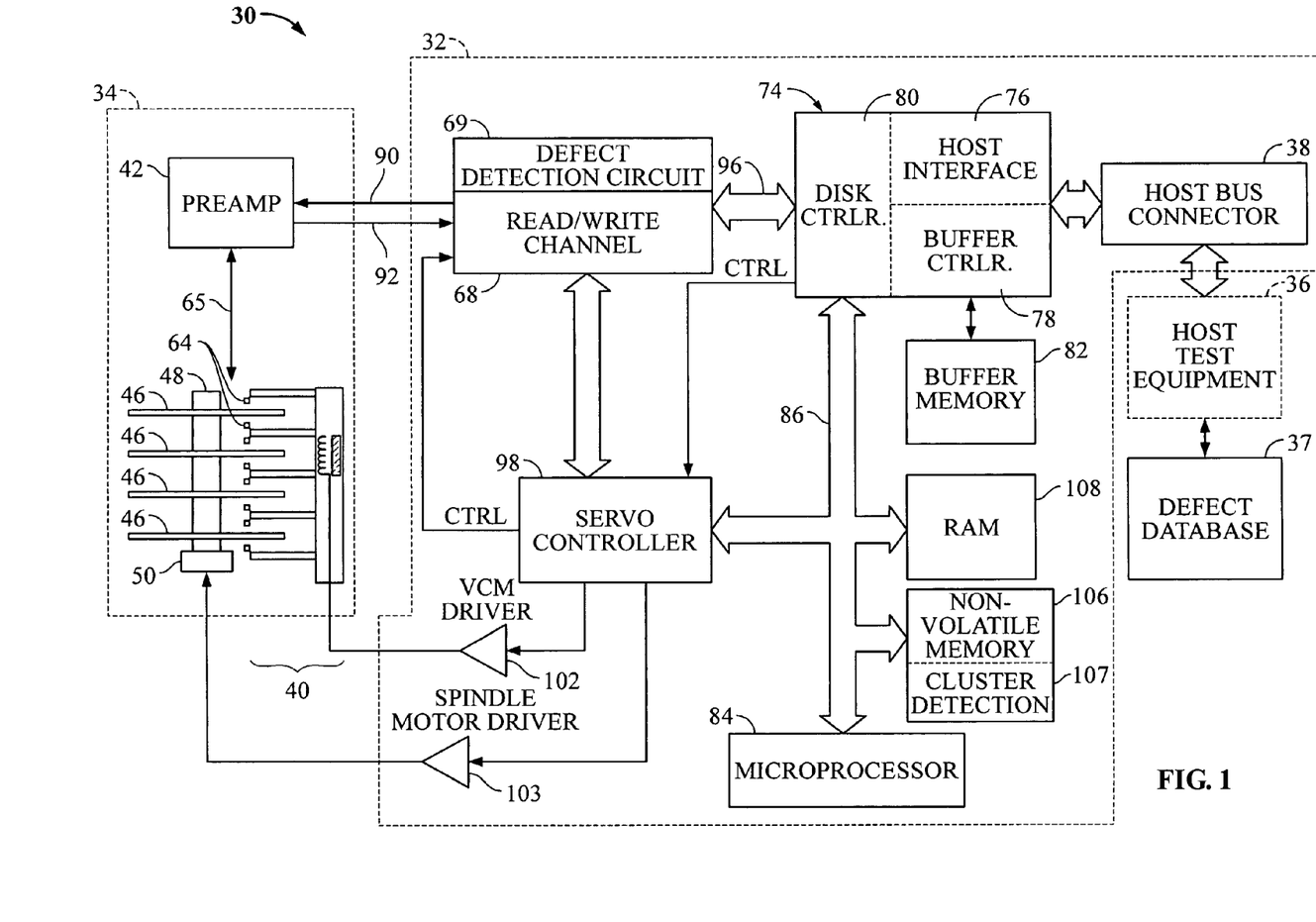
FIG. 1 is a block diagram of a disk drive, such as a hard disk drive, in which embodiments of the invention may be practiced, connected to host test equipment and a defect database.

FIG. 1 shows a block diagram of a disk drive, such as a hard disk drive 30, in which embodiments of the invention may be practiced, connected to host test equipment 36 and defect database 37. One suitable standard for such connection is the Advance Technology Attachment (ATA) standard presently favored for desktop personal computers. Disk drive 30 comprises a Head/Disk Assembly (HDA) 34 and a controller printed circuit board assembly, PCBA 32.

The HDA 34 comprises: one or more disks 46 for data storage; a spindle motor 50 for rapidly spinning each disk 46 (four shown) on a spindle 48; and an actuator assembly 40 for moving a plurality of heads 64 in unison over each disk 46. The heads 64 are connected to a preamplifier 42 via a cable assembly 65 for reading and writing data on disks 46. Preamplifier 42 is connected to channel circuitry in controller PCBA 32 via read data line 92 and write data line 90.

Controller PCBA 32 comprises a read/write channel 68, servo controller 98, host interface and disk controller HIDC 74, voice coil motor driver VCM 102, spindle motor driver SMD 103, microprocessor 84, and several memory arrays—buffer or cache memory 82, RAM 108, and non-volatile memory 106.

Read/write channel 68 may include a defect detection circuit 69, which under the control of a program or routine, may execute methods or processes in accordance with embodiments of the invention to aid in detecting defects on the disk(s) 46 scanned by moveable head(s) 64, as will be discussed. For example, defect detection circuit 69 may be an application specific integrated circuit (ASIC) or other suitable type of circuit. Further, microprocessor 84 may pre-program the defect detection circuit 69 and/or initialize the defect detection circuit with initial and operational values to aid in detecting defects on the disk(s) 46. Although the defect detection circuit 69 is shown as part of the read/write channel 68, it should be appreciated that it may be located elsewhere in the disk drive 30.

Host initiated operations for reading and writing data in disk drive 30 are executed under control of microprocessor 84 connected to the controllers and memory arrays via a bus 86. Program code executed by microprocessor 84 is stored in non-volatile memory 106 and random access memory RAM 108. Program overlay code stored on reserved tracks of disks 46 may also be loaded into RAM 108 as required for execution.

During disk read and write operations, data transferred by preamplifier 42 is encoded and decoded by read/write channel 68. During read operations, channel 68 decodes data into digital bits transferred on an NRZ bus 96 to HIDC 74. During write operations, HIDC provides digital data over the NRZ bus to channel 68 which encodes the data prior to its transmittal to preamplifier 42. Preferably, channel 68 employs PRML (partial response maximum likelihood) coding techniques, although the invention may be practiced with equal advantage using other coding processes.

HIDC 74 comprises a disk controller 80 for formatting and providing error detection and correction of disk data, a host interface controller 76 for responding to commands from host 36, and a buffer controller 78 for storing data which is transferred between disks 46 and host 36. Collectively the controllers in HIDC 74 provide automated functions which assist microprocessor 84 in controlling disk operations.

A servo controller 98 provides an interface between microprocessor 84 and actuator assembly 40 and spindle motor 50. Microprocessor 84 commands logic in servo controller 98 to position actuator 40 using a VCM driver 102 and to precisely control the rotation of spindle motor 50 with a spindle motor driver 103.

Preferably, disk drive 30 employs a sampled servo system in which equally spaced servo wedge sectors (sometimes termed "servo wedges") are recorded on each track of each disk 46. Data sectors are recorded in the intervals between servo sectors on each track. Servo sectors are sampled at regular intervals to provide servo position information to microprocessor 84. Servo sectors are received by channel 68, and are processed by servo controller 98 to provide position information to microprocessor 84 via bus 86. Further, as previously discussed, read/write channel 68 may include a defect detection circuit 69, which under the control of a program or routine, may execute methods or processes in accordance with embodiments of the invention to aid in performing techniques for cluster-based defect detection as will be hereinafter discussed.

Figure 2:
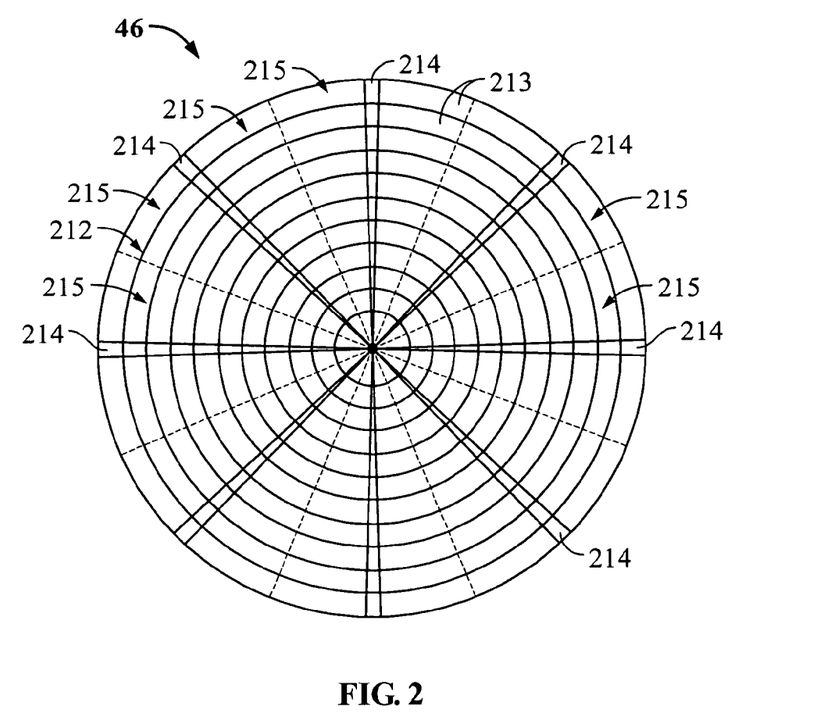
FIG. 2 is a diagram illustrating a disk of a disk drive having a plurality of concentric tracks.

With brief reference to FIG. 2, FIG. 2 is a diagram illustrating a disk 46 of disk drive 30 having a plurality of concentric tracks. Particularly, disk 46 includes a plurality of concentric circumferential tracks 212. Each circumferential track 212 includes a plurality of embedded servo wedges 214 utilized in track following. The plurality of servo wedges 214 are spaced sequentially around a circumference of each circumferential track 212. Typically, the embedded servo wedges 214 contain servo information utilized in track following and are interspersed between data regions, referred to as data wedges 215, of the disk 46. Data is conventionally written in the data wedges 215.

Referring back to FIG. 1, in one embodiment, the invention relates to techniques for cluster-based defect detection testing for disk drives. Particularly, disk drive 30 performs cluster-based defect detection on the disk(s) 46 of the disk drive itself during a cluster-based defect detection process after assembly of the disk drive, but before the disk drive is sent out to the customer.

This system and method includes a defect database 37 coupled to disk drive test equipment 36. The disk drive test equipment 36 is coupled to the disk drive 30 to implement disk drive functionality verification testing before the disk drive is sent out to a customer. One of the tests performed is directed to cluster-based defect detection testing. The actual cluster-based defect detection testing is mainly performed by the disk drive 30 itself. However, as will be discussed, data regarding the cluster-based defect detection may be sent to the defect database 37 for statistical disk drive quality control purposes. Defect database 37 may be operated by a suitable computer.

As previously discussed, the disk drive 30 includes a disk 46 that includes a plurality of tracks wherein each track includes servo wedges and data wedges. The moveable head 64 scans the tracks of the disk. During cluster-based defect detection testing, the defect detection circuit 69 detects defects on the disk 46 scanned by the moveable head 64.

Particularly, in one embodiment, microprocessor 84 controls the cluster-based defect detection testing for the disk drive 30. The microprocessor 84 may operate under the control of a cluster detection program 107 stored in non-volatile memory 106. Cluster detection program 107 may be a firmware or software program to implement cluster-based defect detection techniques within the disk drive 30.

The disk drive 30 may be connected to disk drive test equipment 36 and defect database 37, as part of disk drive functionality verification testing, before the disk drive is sent to the customer. Cluster-based defect detection testing may be performed as part of this testing. Particularly, a surface of disk 46 is scanned by the moveable head 64 and the defect detection circuit 69 detects the defects on the disk scanned by the moveable head. Based on this, a map or table of all the defects on the disk are recorded and stored to memory (e.g. RAM 108).

The microprocessor 84 under the control of the cluster detection program 107 first defines a scan window in which the scan window corresponds to an area of the disk that was scanned by the moveable head. Particularly, the scan window may be compared against the map of all of the defects previously detected on the surface of the disk. A cluster threshold is defined that corresponds to a minimum number of defects required to occur within the scan window. A defect cluster is identified if a cluster threshold of defects occurs within one of the scan windows. A defect cluster record of all the identified defect clusters may be generated and then transferred to the defect database 37.

Figure 3:
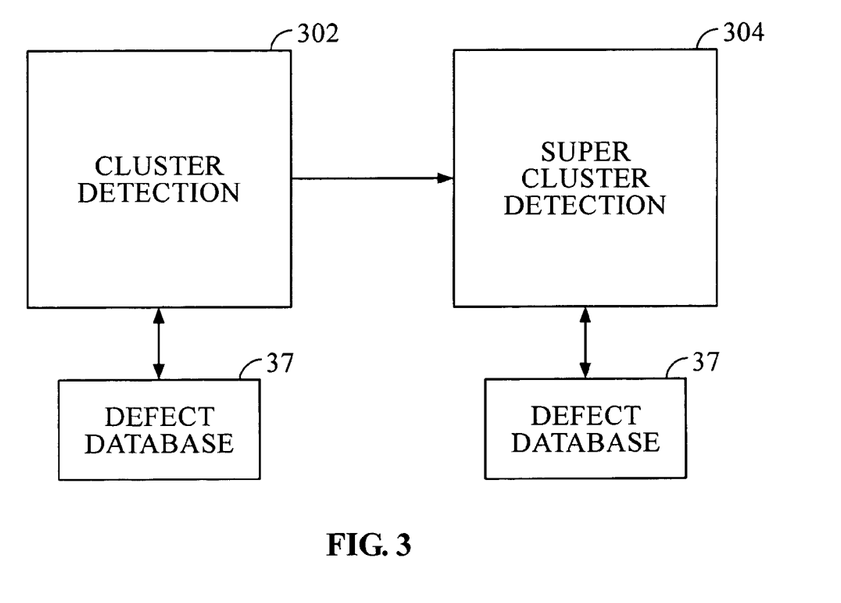
FIG. 3 is a block diagram illustrating an overview of the components of cluster-based defect detection testing, according to one embodiment of the present invention.

With brief reference to FIG. 3, FIG. 3 is a block diagram illustrating a broad overview of the components of cluster-based defect detection testing. As shown in FIG. 3, cluster detection 302 is first performed to identify defect clusters. A defect cluster record of identified defect clusters may then be generated and transmitted to the defect database 37. Further, data from the initial cluster detection 302 may be utilized in super cluster detection 304 to identify super clusters. Super cluster detection will be discussed in more detail later. A super cluster record may then also be generated and transmitted to the defect database 37.

Embodiments of cluster detection and super cluster detection will now be discussed in detail. It should be appreciated that by identifying data defect clusters, servo defect clusters, and super clusters, that these regions on the disk can then be margined. In other words, the locations of these data defect clusters, servo defect clusters, and super cluster regions on the disk may be stored in the memory of the disk drive as areas that are not to be used for reading or writing data to. Further, these identified data defect clusters, servo defect clusters, and super clusters and their corresponding event records may be forwarded to the defect database for statistical control purposes to potentially identify problems with components of the disk drive, the assembly of the disk drive, or problems with disks possibly being supplied by a disk vendor for assembly into the disk drive.

Figure 4:
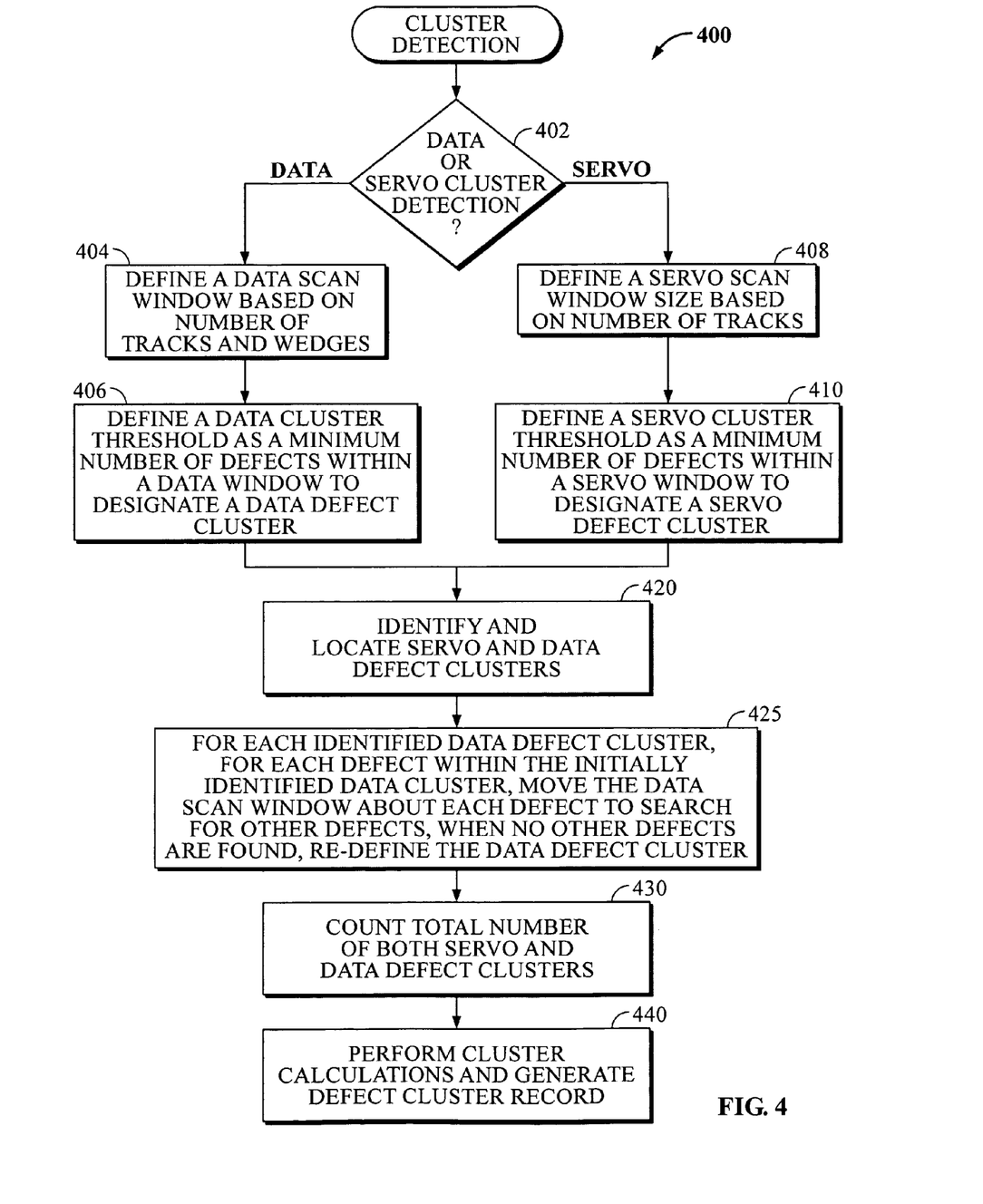
FIG. 4 is a flow diagram illustrating a method of cluster-based defect detection, according to one embodiment of the present invention.

Turning to FIG. 4, FIG. 4 is a flow diagram illustrating a method 400 of cluster-based defect detection. As previously discussed, it should be appreciated that method 400 may be implemented by the microprocessor of the disk drive under the control of the cluster detection program. At step 402, it is determined whether data or servo cluster detection is to be implemented.

If data cluster detection is to be implemented, then at step 404, a data scan window is defined by a predetermined number of tracks and a predetermined number of data wedges. At step 406, a data cluster threshold is defined as a pre-determined minimum number of defects required to occur within the data scan window in order to designate a data defect cluster. At step 420 data defect clusters are identified and located.

Figure 5A:
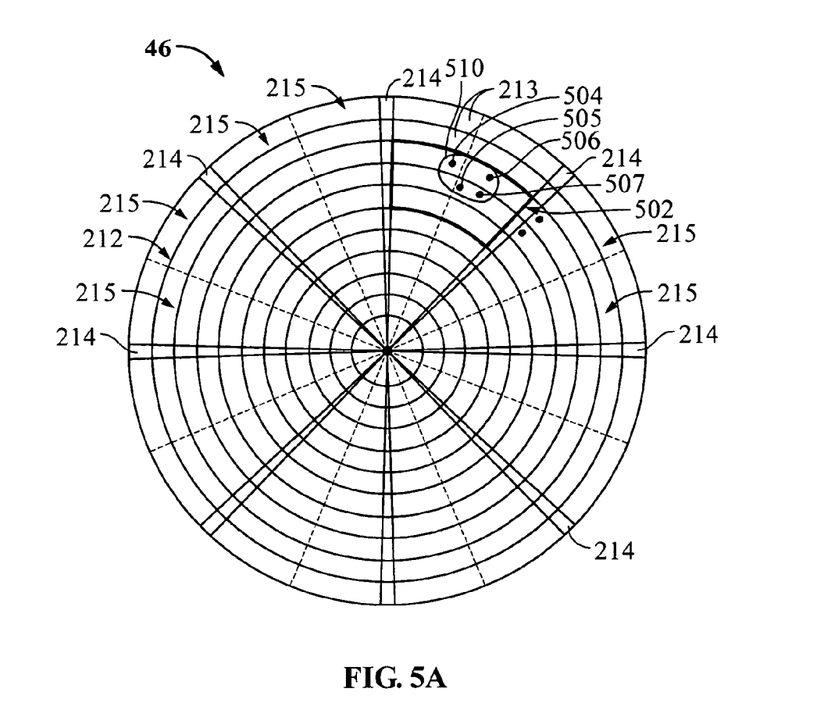
FIG. 5A is a diagram showing a map of a disk having a plurality of defects that is subjected to data cluster defect detection, according to one embodiment of the present invention.

Referring briefly to FIG. 5A, FIG. 5A is a diagram showing a map of a disk 46 having a plurality of previously identified defects that is subjected to data cluster detection. In this example, a data scan window 502 is defined as being two data wedges long circumferentially and being three tracks wide radially. As can be seen in scan window 502, there are four defects 504, 505, 506, and 507. Accordingly, assuming a data cluster threshold is set to a value less than 4, e.g. 2, data scan window 502 has a cluster of defects 510. This data cluster 510 has thus been identified and located and can be recorded as part of a defect cluster record for further processing.

The data cluster detection process may further, for each identified data defect cluster, for each defect within each identified data cluster, move the data scan window about each defect to search for other defects as set forth in step 425. Further, as set forth in step 425, when no other defects are found, the data defect cluster may be re-defined.

Figure 5B:
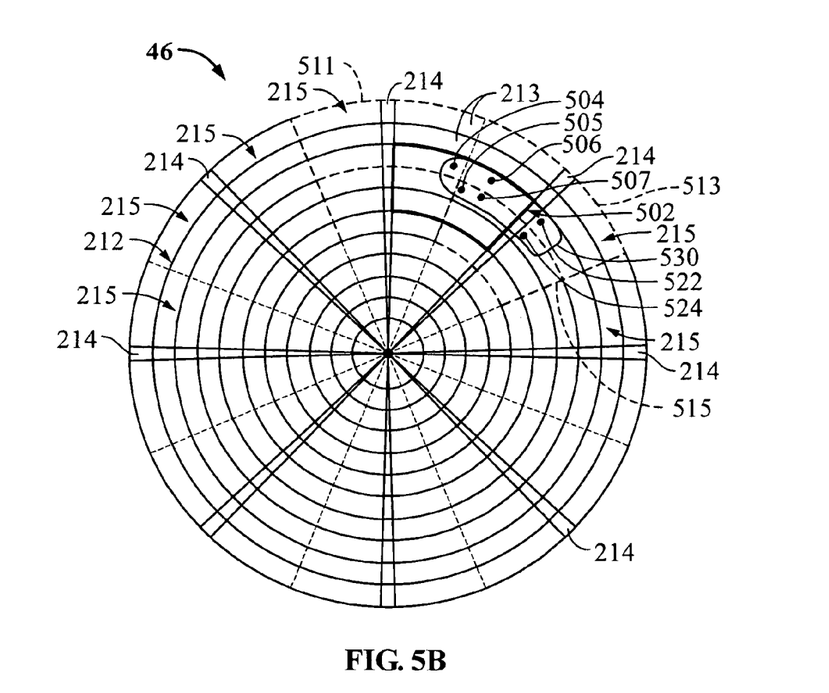
FIG. 5B is a diagram showing a map of a disk that is subjected to a moving scan window process for data cluster defect detection, according to one embodiment of the present invention.

Turning briefly to FIG. 5B, FIG. 5B is a diagram showing a map of a disk 46 having a plurality of previously identified defects of a disk that is subjected to a moving scan window process for data cluster detection. For example, the scan window may be moved about defect 504 as identified as moved scan window 511 to search for other defects. In this case, no other defects are found. Further, the data scan window may be further moved about defects 505 and 506 as shown by moved data scan window 515. In this case, another defect 524 is identified and located. Further, the original data scan window may also be moved about defect 506 to create moved data scan window 513. In this instance, another defect 522 is also found. Based on this moving scan window process two additional defects 522 and 524 are identified and located and the original data defect cluster 510 is redefined as data defect cluster 522.

Turning back to FIG. 4, on the other hand, if servo cluster detection at step 402 is to be implemented, then a servo scan window is defined. The area of the servo scan window is defined based on a number of tracks as set forth in step 408. At step 410, a servo cluster threshold is defined as a predetermined number of defects required to occur within a servo wedge of the servo window to designate a servo defect cluster. At step 420 servo defect clusters are located and identified.

Figure 6:
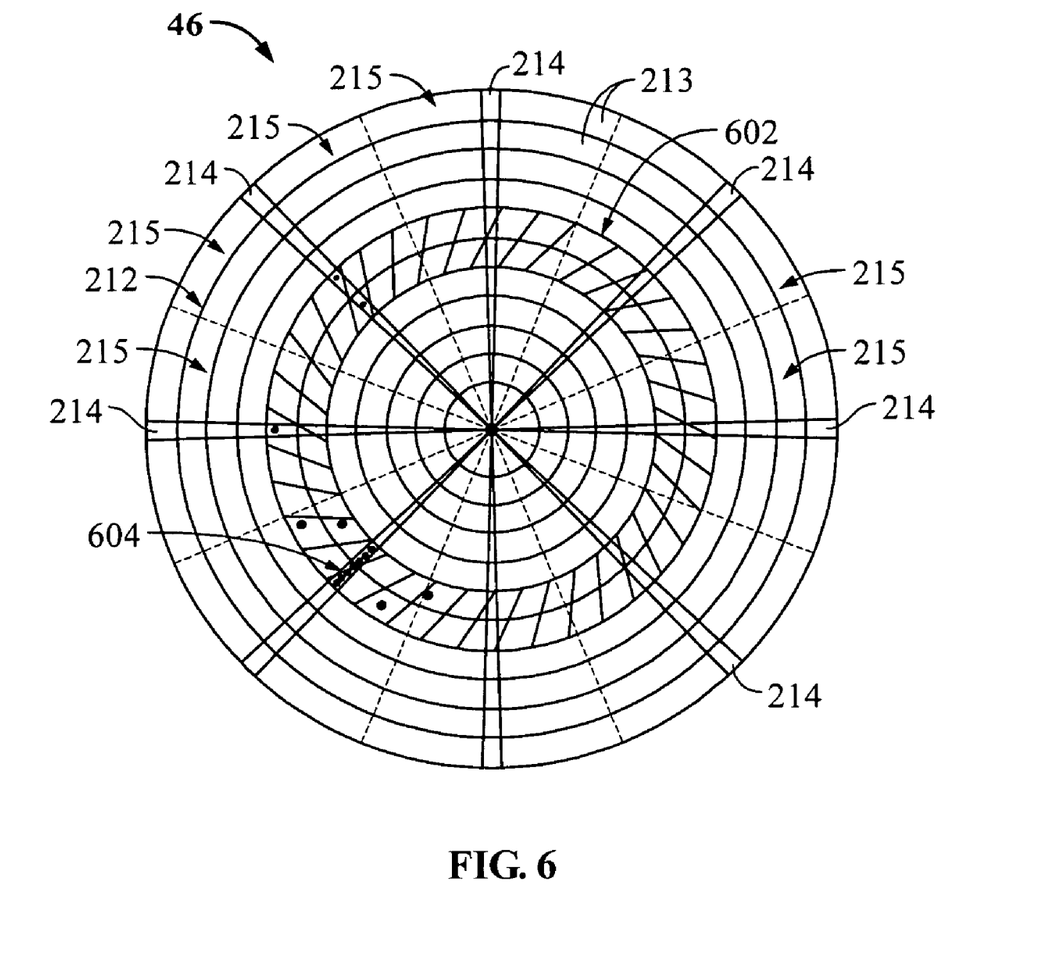
FIG. 6 is a diagram showing a map of a disk having a plurality of defects that is subjected servo cluster defect detection, according to one embodiment of the present invention.

As an example of this, briefly looking at FIG. 6, FIG. 6 is a diagram showing a map of a disk 46 having a plurality of previously identified defects that is subjected to servo cluster detection. Particularly, as shown in FIG. 6, a servo scan window 602 is defined as being two circumferential tracks wide and in one of the servo wedges 604 a predetermined minimum number of defects (e.g. at least 3) is detected and a servo defect cluster is identified. In the case of the servo defect cluster, the servo defect cluster is defined as being the same as the servo scan window. Here, the servo defect cluster is shown as servo defect cluster 602. However, the servo defect cluster may also just be designated as the servo wedge 604 itself.

Returning back to FIG. 4, at step 430, the total number of both the identified data defect clusters and servo defect clusters are counted. Next, at step 440 various cluster calculations for the data defect clusters and servo defect clusters may be performed and a defect cluster record may be generated. These will be discussed in more detail hereinafter.

Figure 7:
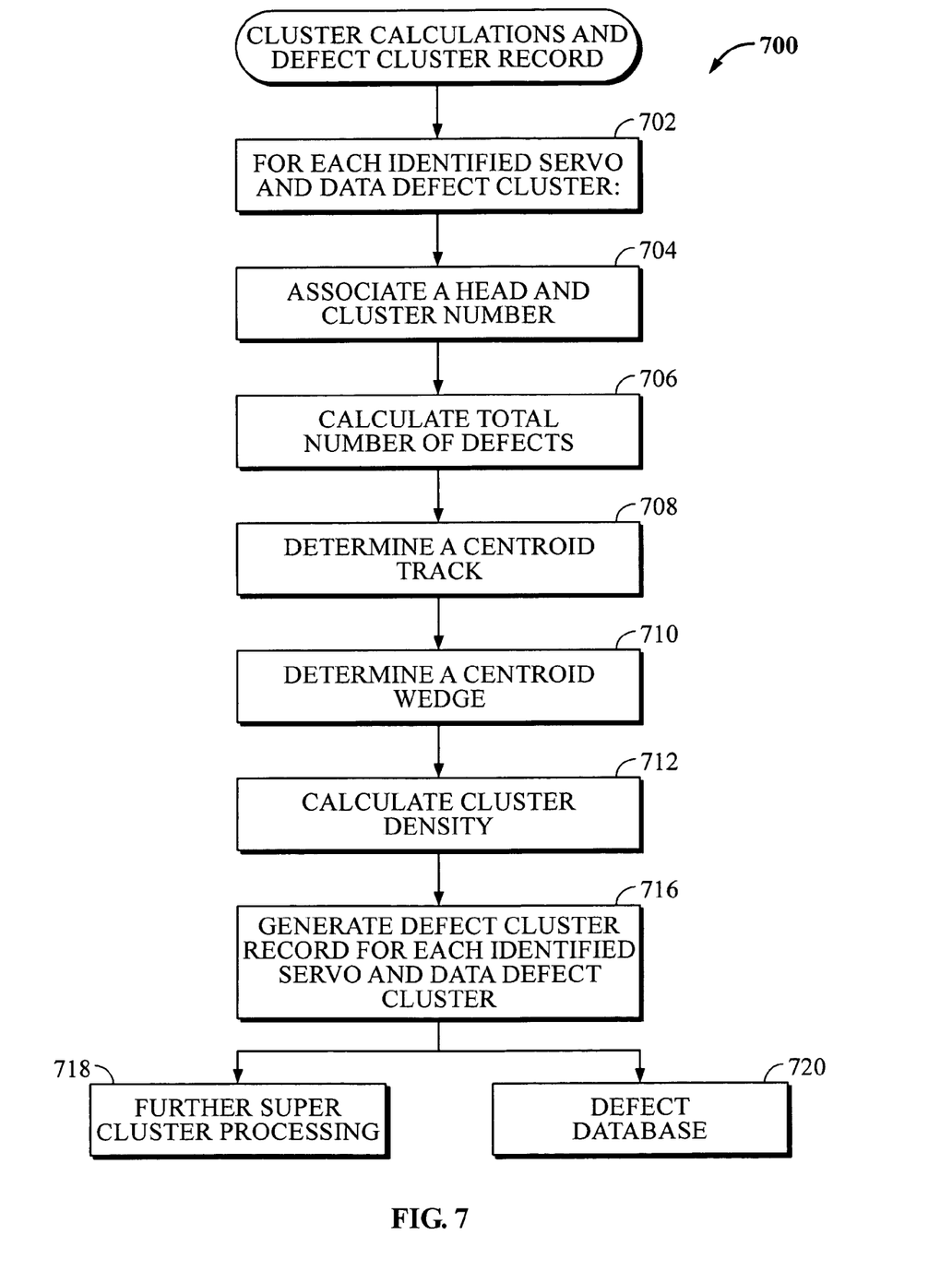
FIG. 7 is a flow diagram illustrating examples of cluster calculations that may be performed and included in a defect cluster record, according to one embodiment of the present invention.

Turning now to FIG. 7, FIG. 7 is a flow diagram illustrating examples of cluster calculations that may be performed and included in a defect cluster record. For example, as shown at step 702, for each identified servo and data defect cluster, a variety of different calculations may be performed. As one example, at step 704, a head and a cluster number may be associated with each identified servo and data defect cluster. At step 706, a total number of defects may be calculated for each identified servo and data defect cluster.

At step 708, a centroid track may be determined for each identified servo and data defect cluster. The centroid track may be determined by a summation of all the tracks in the defect cluster divided by the total number of tracks summed. At step 710, a centroid wedge may be calculated for each identified servo and data defect cluster. The centroid wedge may be determined by a summation of all the wedges in the defect cluster divided by the total number of wedges summed. Further, at step 712, a cluster density may be calculated for each identified servo and data defect cluster. The cluster density may be based on the average distance of defects in a cluster from the cluster centroid.

At step 716, a defect cluster record may be generated for each identified servo and data defect cluster. The data defect cluster record for each identified servo and data defect cluster may then be utilized in step 719 for further super cluster processing, as will be discussed, and may also be transmitted to a defect database (step 720).

Figure 8:
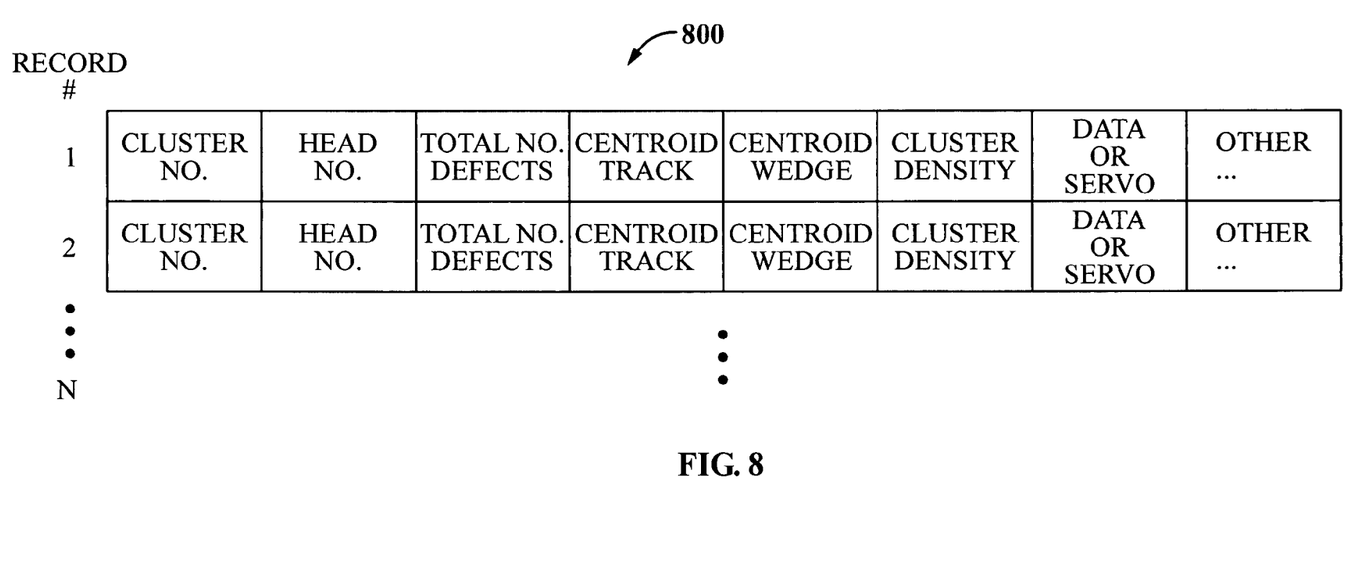
FIG. 8 is a table illustrating an example of the types of data that may be included in a defect cluster record for a plurality of identified servo and data defect clusters, according to one embodiment of the present invention.

Referring briefly to FIG. 8, FIG. 8 shows a table 800 illustrating an example of the types of data that may be included in a defect cluster record for a plurality of identified servo and data defect clusters. As shown in FIG. 8, there may be a plurality of records 1-N. For each record, each servo or data defect cluster may be identified by a cluster number, a head number, a total number of defects within the cluster, a centroid track, a centroid wedge, a cluster density, as well as whether or not the defect cluster is a data defect cluster or a servo data cluster. Other data may be also included in the defect cluster record. For example, for a data defect cluster a value representative of the approximate cluster shape may be included in the defect cluster record.

By identifying and locating data defect clusters, these cluster regions on the disk can be margined. In other words, the locations of these data defect clusters and servo defect clusters on the disk may be stored in the memory of the disk drive as areas that are not to be used for reading or writing data to. Further, these identified data defect clusters and servo defect clusters, as well as the previously discussed statistical calculations reflected in the defect cluster record, may be forwarded to the defect database for statistical control purposes to potentially identify problems with components of the disk drive, the assembly of the disk drive, or problems with the disks themselves that are possibly being supplied by a disk vendor.

Figure 9:
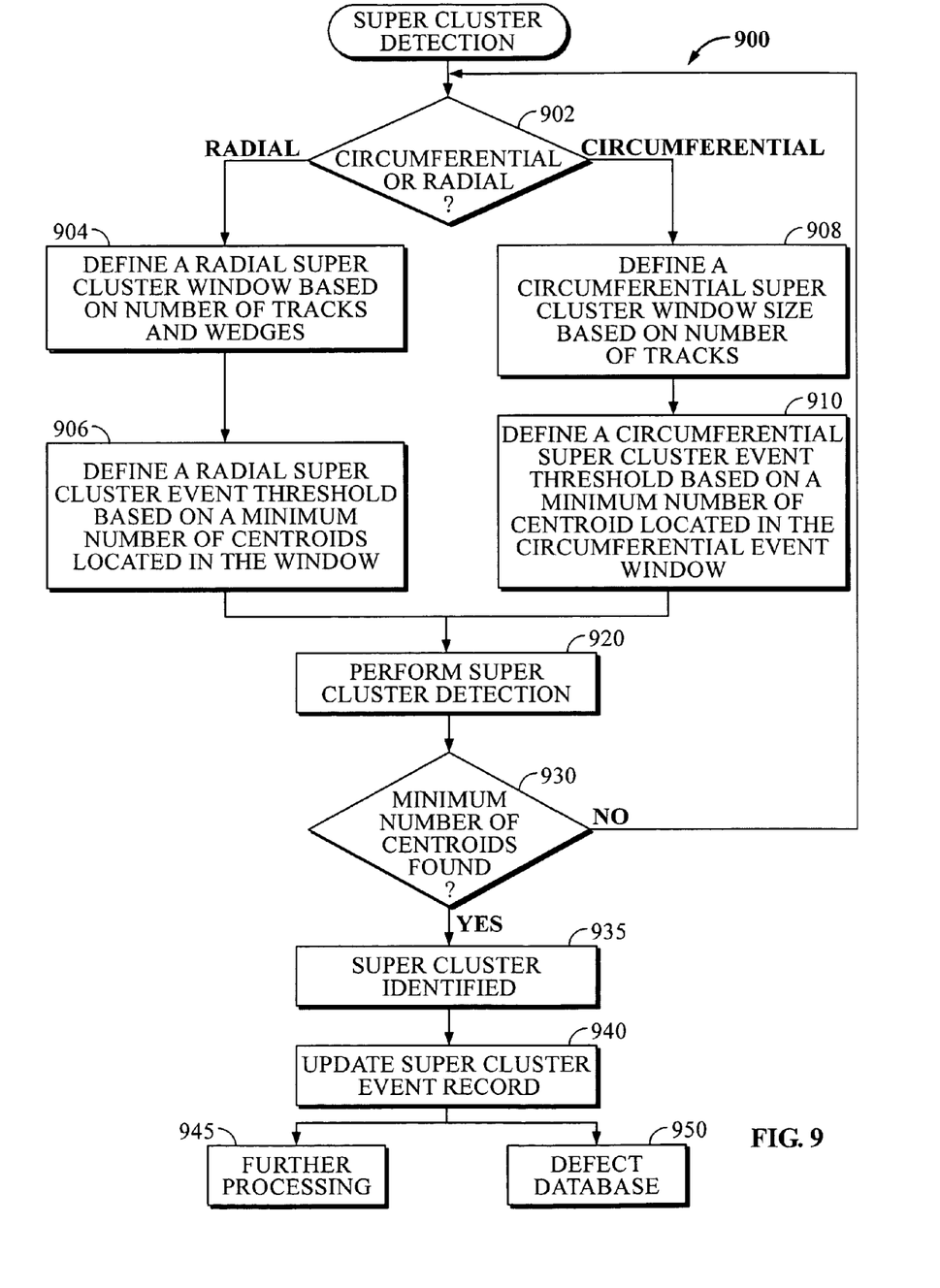
FIG. 9 is a flow diagram illustrating a method for super cluster detection, according to one embodiment of the present invention.

With reference now to FIG. 9, FIG. 9 is a flow diagram illustrating a method 900 for super cluster detection. Again, as previously discussed, it should be appreciated that method 900 may be implemented by the microprocessor of the detection program. It should be noted that super cluster detection only applies to data defect clusters. Super cluster detection is directed to determining whether the centroids of two or more data defect clusters fall within a certain window in which case the event is classified as a cluster event. This is relevant because when two or more clusters fall within a predefined window, the area between the two data defect clusters is more susceptible to defects.

At step 902 it is determined whether circumferential or radial super cluster detection is to be employed. If at step 902 radial super cluster detection is to be implemented, then at step 904 a radial super cluster window based on both a number of tracks and wedges is defined. Next, at step 906, a radial super cluster event threshold based on a minimum number of centroids of corresponding data defect clusters required to be located in the radial super cluster window is also defined. At step 920, super cluster detection is performed. At block 930, it is determined whether a minimum number of centroids for corresponding identified data defect clusters required to occur (based on the minimum threshold) are found. If not, super cluster detection can be performed again. For example, as with the previously discussed cluster detection, a moving radial super cluster window could be employed. In this case, a new radial super cluster window based on an iterated number of tracks and wedges would be defined and the process repeated.

However, if the minimum number of centroids for corresponding identified data defect clusters is found, then a super radial defect cluster is identified at step 935.

Figure 10:
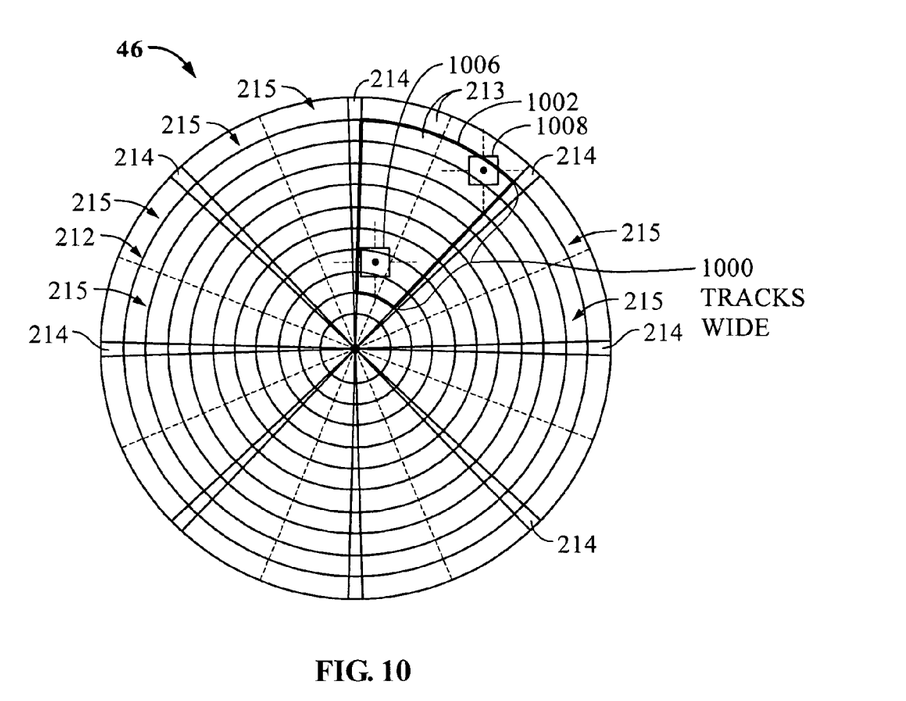
FIG. 10 is a diagram showing a map of a disk having a plurality of clusters and illustrates a radial super cluster detection process, according to one embodiment of the present invention.

For example, referring briefly to FIG. 10, FIG. 10 is a diagram showing a map of a disk having a plurality of previously identified clusters and illustrates a radial super cluster detection process. As shown in FIG. 10, a radial super cluster window 1002 that is two wedges long circumferentially and one thousand tracks radially wide is defined and processed. Within this radial super cluster window 1002, the centroids of two previously identified data defect clusters 1006 and 1008 are determined to be within the radial super cluster window 1002 such that a super radial data defect cluster including the two identified data defect clusters is identified.

With reference back to FIG. 9, thus at step 935 this radial super cluster is identified and a super cluster event record may be updated at step 940. Further, the super cluster event record may undergo further processing at step 945 or be used to update the defect database 950.

Circumferential super cluster processing may also be applied to previously identified data defect clusters. At step 902 if circumferential super cluster processing is to be performed then at step 908 a circumferential super cluster window size based on a number of tracks is defined. Then, at block 910 a circumferential super cluster event threshold based on a minimum number of centroids for corresponding data defect clusters located in the circumferential event window is also defined. Super cluster detection is then performed at step 920 for the circumferential event window.

At step 930 if a minimum number of centroids for corresponding identified data defect clusters required to occur within the circumferential super cluster window are determined to be within the circumferential super cluster window then a super circumferential cluster at block 935 is identified. Otherwise, the process can be repeated, for example, by simply iterating the circumferential event window to look for other centroids of other previously identified data defect clusters.

Figure 11:
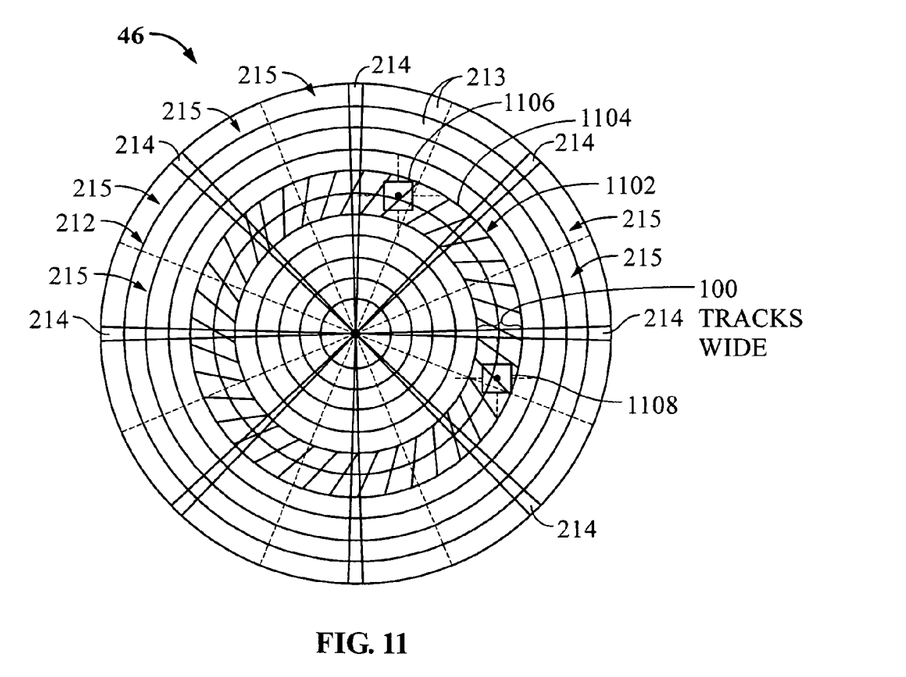
FIG. 11 is a diagram showing a map of a disk having a plurality of clusters and illustrates a circumferential super cluster detection process, according to one embodiment of the present invention.

For example, briefly referring to FIG. 11, FIG. 11 is a diagram showing a map of a disk having a plurality of previously identified clusters and illustrates a circumferential super cluster detection process. Particularly, FIG. 11 illustrates a circumferential super cluster window that is 100 tracks radially wide and is independent of wedges. As can be seen in this example in FIG. 11, two centroids of two corresponding previously identified data defect clusters 1106 and 1108 are determined to be within the circumferential super cluster window complying with, for example, a threshold minimum number of centroids of two, and a super circumferential data defect cluster is identified.

Turning back to FIG. 9, for both the identified radial and circumferential super clusters that have been identified at step 935 a super cluster event record 940 can be updated. The super cluster event record may undergo further processing at block 945 and can also be transmitted to the defect database 950.

As previously discussed with reference to data defect clusters and servo defect clusters, identified radial and circumferential super clusters on the disk may likewise be margined. For example, the whole radial or circumferential super cluster window may be margined, or, areas in between super clusters may simply be margined. This is because there is a high likelihood that defects may occur between super clusters.

Thus, theses identified areas of super cluster regions, as well as previously discussed data defect clusters and servo defect clusters may be stored in the memory of the disk drive as areas that are not to be used for reading or writing data to (i.e. super clusters may be margined). Alternatively, margining for super clusters may not be implemented and their identities and locations may simply be utilized for statistical purposes. Data regarding the identified super clusters as part of a super cluster event record may be forwarded to the defect database for statistical control purposes to potentially identify problems with components of the disk drive, the assembly of the disk drive, or problems with disks possibly being supplied by a disk vendor.

It should be appreciated that numerous alternatives for other types of disk drives with similar or other media format characteristics can be employed by those skilled in the art to use the invention with equal advantage to implement cluster-based defect detection testing. Further, although the embodiments have been described in the context of a disk drive with embedded servo sectors, the invention can be employed in many different types of disk drives having a head actuator that scans the media.

We claim:

1. A disk drive to perform cluster-based defect detection on a disk included within the disk drive, the disk drive comprising:

a disk including a plurality of tracks, each track including servo wedges and data wedges;

a moveable head to scan the tracks of the disk;

a defect detection circuit to detect defects on the disk scanned by the moveable head;

a microprocessor for controlling operations in the disk drive including cluster-based defect detection, the microprocessor under the control of a cluster detection program to:
define a data scan window corresponding to an area of the disk scanned by the moveable head, the data scan window having an area defined by a number of tracks and data wedges;
define a data cluster threshold corresponding to a minimum number of defects occurring within the data scan window; and
identify a data defect cluster if the defect detection circuit detects that a number of defects within the data scan window exceeds the data cluster threshold, wherein for each defect of an identified data defect cluster, the data scan window is moved about each defect and other defects within the moved data scan window are identified, and the data defect cluster is then re-defined to include the other identified defects.

2. The disk drive of claim 1, wherein the microprocessor is further operable to:
define a servo scan window having an area defined by a number of tracks;
define a servo cluster threshold corresponding to a minimum number of defects occurring within the servo scan window; and
identify a servo defect cluster if a number of defects within the servo scan window for a servo wedge exceeds the servo cluster threshold.

3. The disk drive of claim 2, wherein, the microprocessor under the control of the cluster detection program counts a total number of both the data defect clusters and servo defect clusters identified.

4. The disk drive of claim 2, wherein, the microprocessor under the control of the cluster detection program generates a defect cluster record of both the data defect clusters and servo defect clusters identified.

5. The disk drive of claim 4, wherein, the defect cluster record of both the data defect clusters and servo defect clusters is transmitted to a defect database.

6. The disk drive of claim 2, wherein, the microprocessor under the control of the cluster detection program for each identified data defect cluster and servo defect cluster associates a cluster number and a corresponding head.

7. The disk drive of claim 2, wherein, the microprocessor under the control of the cluster detection program for each identified data defect cluster and servo defect cluster calculates a total number of defects.

8. The disk drive of claim 2, wherein, the microprocessor under the control of the cluster detection program for each identified data defect cluster and servo defect cluster calculates a cluster density.

9. The disk drive of claim 1, wherein, the microprocessor under the control of the cluster detection program for each identified data defect cluster determines a centroid track and a centroid wedge.

10. The disk drive of claim 1, wherein, the microprocessor under the control of the cluster detection program for each identified data defect cluster determines a cluster shape.

11. The disk drive of claim 1, wherein, the microprocessor under the control of the cluster detection program further defines a radial super cluster window based on a number of tracks and wedges and defines a radial super cluster event threshold based on a minimum number of centroids for corresponding identified data defect clusters required to occur within the radial super cluster window, and if the minimum number of centroids for corresponding identified data defect clusters are determined to be in the radial super cluster window, then a super radial data defect cluster is identified.

12. The disk drive of claim 11, wherein, the microprocessor under the control of the cluster detection program further defines a circumferential super cluster window based on a number of tracks and defines a circumferential super cluster event threshold based on a minimum number of centroids for corresponding identified data defect clusters required to occur within the circumferential super cluster window, and if the minimum number of centroids for corresponding identified data defect clusters are determined to be in the circumferential super cluster window, then a super circumferential data defect cluster is identified.

13. The disk drive of claim 12, wherein, the microprocessor under the control of the cluster detection program generates a super cluster event record of both identified super circumferential data defect clusters and super radial data defect clusters.

14. The disk drive of claim 13, wherein, the super cluster event record is transmitted to a defect database.

15. In a disk drive, the disk drive including a disk having a plurality of tracks, each track including servo wedges and data wedges and a moveable head to scan the tracks of the disk, a method to perform cluster-based defect detection on the disk comprising:
detecting defects on the disk scanned by the moveable head;
defining a data scan window corresponding to an area of the disk scanned by the moveable head, the data scan window having an area defined by a number of tracks and data wedges;
defining a data cluster threshold corresponding to a minimum number of defects occurring within the data scan window;
identifying a data defect cluster if a number defects within the data scan window exceeds the data cluster threshold, wherein for each defect of an identified data defect cluster the data scan window is moved about each defect and other defects within the moved data scan window are identified; and
re-defining the data defect cluster to include the other identified defects.

16. The method of claim 15, further comprising:
defining a servo scan window having an area defined by a number of tracks;
defining a servo cluster threshold corresponding to a minimum number of defects occurring within the servo scan window; and
identifying a servo defect cluster if a number of defects within the servo scan window for a servo wedge exceeds the servo cluster threshold.

17. The method of claim 16, wherein, for each identified data defect cluster and servo defect cluster, further comprising associating a cluster number and a corresponding head.

18. The method of 16, wherein, for each identified data defect cluster and servo defect cluster, further comprising calculating a total number of defects.

19. The method of claim 16, wherein, for each identified data defect cluster and servo defect cluster, further comprising calculating a cluster density.

20. The method of claim 16, further comprising counting a total number of identified data defect clusters and servo defect clusters.

21. The method of claim 16, further comprising generating a defect cluster record of both the data defect clusters and servo defect clusters identified.

22. The method of claim 21, wherein, the defect cluster record of both the data defect clusters and servo defect clusters is transmitted to a defect database.

23. The method of claim 15, further comprising determining a centroid track and a centroid wedge for each identified data defect cluster.

24. The method of claim 15, further comprising determining a cluster shape for each identified data defect cluster.

25. The method of claim 15, further comprising defining a radial super cluster window based on a number of tracks and wedges and defining a radial super cluster event threshold based on a minimum number of centroids for corresponding identified data defect clusters required to occur within the radial super cluster window, and if the minimum number of centroids for corresponding identified data defect clusters are determined to be in the radial super cluster window, then a super radial data defect cluster is identified.

26. The method of claim 25, further comprising defining a circumferential super cluster window based on a number of tracks and defining a circumferential super cluster event threshold based on a minimum number of centroids for corresponding identified data defect clusters required to occur within the circumferential super cluster window, and if the minimum number of centroids for corresponding identified data defect clusters are determined to be in the circumferential super cluster window, then a super circumferential data defect cluster is identified.

27. The method of claim 26, further comprising generating a super cluster event record of both identified super circumferential data defect clusters and super radial data defect clusters.

28. The method of claim 27, further comprising transmitting the super cluster event record to a defect database.

29. A system including a disk drive to perform cluster-based defect detection on a disk included within the disk drive, the system comprising:
a defect database coupled to disk drive test equipment, the disk drive test equipment coupled to the disk drive to implement disk drive functionality verification testing;
the disk drive including:
a disk including a plurality of tracks, each track including servo wedges and data wedges;
a moveable head to scan the tracks of the disk;
a defect detection circuit to detect defects on the disk scanned by the moveable head;
a microprocessor for controlling operations in the disk drive including cluster-based defect detection, the microprocessor under the control of a cluster detection program to:
define a scan window, the scan window corresponding to an area of the disk scanned by the moveable head;
define a cluster threshold, the cluster threshold corresponding to a minimum number of defects required to occur within the scan window;
identify a defect cluster if a cluster threshold of defects occurs within the scan window;
generate a defect cluster record of identified defect clusters; and transmit the defect cluster record to the defect database.

30. The system of claim 29, wherein the scan window is a data scan window, the area of the data scan window is defined by a number of tracks and data wedges and a data cluster threshold is defined as corresponding to a minimum number of defects required to occur within the data scan window, and if the data cluster threshold of defects is detected within the data scan window, then a data defect cluster is identified.

31. The system of claim 30, wherein for each defect of an identified data defect cluster, the data scan window is moved about each defect and other defects within the moved data scan window are identified, the identified data defect cluster is then re-defined to include the other identified defects.

32. The system of claim 30, wherein, the microprocessor under the control of the cluster detection program for each identified data defect cluster determines a centroid track and a centroid wedge.

33. The system of claim 30, wherein, the microprocessor under the control of the cluster detection program for each identified data defect cluster determines a cluster shape.

34. The system of claim 30, wherein, the microprocessor under the control of the cluster detection program further defines a radial super cluster window based on a number of tracks and wedges and defines a radial super cluster event threshold based on a minimum number of centroids for corresponding identified data defect clusters required to occur within the radial super cluster window, and if the minimum number of centroids for corresponding identified data defect clusters are determined to be in the radial super cluster window, then a super radial data defect cluster is identified.

35. The system of claim 34, wherein, the microprocessor under the control of the cluster detection program further defines a circumferential super cluster window based on a number of tracks and defines a circumferential super cluster event threshold based on a minimum number of centroids for corresponding identified data defect clusters required to occur within the circumferential super cluster window, and if the minimum number of centroids for corresponding identified data defect clusters are determined to be in the circumferential super cluster window, then a super circumferential data defect cluster is identified.

36. The system of claim 35, wherein, the microprocessor under the control of the cluster detection program generates a super cluster event record of both identified super circumferential data defect clusters and super radial data defect clusters.

37. The system of claim 36, wherein, the super cluster event record is transmitted to the defect database.

38. The system of claim 30, wherein the scan window is a servo scan window, the area of the servo scan window is defined by a number of tracks and a servo cluster threshold is defined as corresponding to a minimum number of defects required to occur within the servo scan window, and if the servo cluster threshold of defects within the servo scan window is detected for a servo wedge, then a servo defect cluster is identified.

39. The system of claim 38, wherein, the microprocessor under the control of the cluster detection program counts a total number of both the data defect clusters and servo defect clusters identified.

40. The system of claim 38, wherein, the microprocessor under the control of the cluster detection program generates a defect cluster record of both the data defect clusters and servo defect clusters identified.

41. The system of claim 40, wherein, the defect cluster record of both the data defect clusters and servo defect clusters is transmitted to the defect database.

42. The system of claim 38, wherein, the microprocessor under the control of the cluster detection program for each identified data defect cluster and servo defect cluster associates a cluster number and a corresponding head.

43. The system of claim 38, wherein, the microprocessor under the control of the cluster detection program for each identified data defect cluster and servo defect cluster calculates a total number of defects.

44. The system of claim 38, wherein, the microprocessor under the control of the cluster detection program for each identified data defect cluster and servo defect cluster calculates a cluster density.

45. A disk drive to perform cluster-based defect detection on a disk included within the disk drive, the disk drive comprising:
- a disk including a plurality of tracks, each track including servo wedges and data wedges;
- a moveable head to scan the tracks of the disk;
- a defect detection circuit to detect defects on the disk scanned by the moveable head;
- a microprocessor for controlling operations in the disk drive including cluster-based defect detection, the microprocessor under the control of a cluster detection program to:
  - define a data scan window corresponding to an area of the disk scanned by the moveable head, the data scan window having an area defined by a number of tracks and data wedges;
  - define a data cluster threshold corresponding to a minimum number of defects occurring within the data scan window;
  - identify a data defect cluster if the defect detection circuit detects a number of defects within the data scan window exceeds the data cluster threshold; and
  - determine, for each identified data defect cluster, a centroid track and a centroid wedge.

46. The disk drive of claim 45, wherein, the microprocessor under the control of the cluster detection program further defines a radial super cluster window based on a number of tracks and wedges and defines a radial super cluster event threshold based on a minimum number of centroids for corresponding identified data defect clusters required to occur within the radial super cluster window, and if the minimum number of centroids for corresponding identified data defect clusters are determined to be in the radial super cluster window, then a super radial data defect cluster is identified.

47. The disk drive of claim 46, wherein, the microprocessor under the control of the cluster detection program further defines a circumferential super cluster window based on a number of tracks and defines a circumferential super cluster event threshold based on a minimum number of centroids for corresponding identified data defect clusters required to occur within the circumferential super cluster window, and if the minimum number of centroids for corresponding identified data defect clusters are determined to be in the circumferential super cluster window, then a super circumferential data defect cluster is identified.

48. The disk drive of claim 47, wherein, the microprocessor under the control of the cluster detection program generates a super cluster event record of both identified super circumferential data defect clusters and super radial data defect clusters.

49. The disk drive of claim 48, wherein, the super cluster event record is transmitted to a defect database.

50. In a disk drive, the disk drive including a disk having a plurality of tracks, each track including servo wedges and data wedges and a moveable head to scan the tracks of the disk, a method to perform cluster-based defect detection on the disk comprising:
- detecting defects on the disk scanned by the moveable head;
- defining a data scan window corresponding to an area of the disk scanned by the moveable head, the data scan window having an area defined by a number of tracks and data wedges;
- defining a data cluster threshold corresponding to a minimum number of defects occurring within the data scan window;
- identifying a data defect cluster if a number defects within the data scan window exceeds the data cluster threshold; and
- determining, for each identified data defect cluster, a centroid track and a centroid wedge.

51. The method of claim 50, further comprising defining a radial super cluster window based on a number of tracks and wedges and defining a radial super cluster event threshold based on a minimum number of centroids for corresponding identified data defect clusters required to occur within the radial super cluster window, and if the minimum number of centroids for corresponding identified data defect clusters are determined to be in the radial super cluster window, then a super radial data defect cluster is identified.

52. The method of claim 51, further comprising defining a circumferential super cluster window based on a number of tracks and defining a circumferential super cluster event threshold based on a minimum number of centroids for corresponding identified data defect clusters required to occur within the circumferential super cluster window, and if the minimum number of centroids for corresponding identified data defect clusters are determined to be in the circumferential super cluster window, then a super circumferential data defect cluster is identified.

53. The method of claim 52, further comprising generating a super cluster event record of both identified super circumferential data defect clusters and super radial data defect clusters.

54. The method of claim 53, further comprising transmitting the super cluster event record to a defect database.

* * * * *